(12) United States Patent
Colline

(10) Patent No.: US 10,642,816 B2
(45) Date of Patent: May 5, 2020

(54) PROTECTION SECTOR AND DATABASE USED TO VALIDATE VERSION INFORMATION OF USER DATA

(71) Applicant: Seagate Technology LLC, Cupertino, CA (US)

(72) Inventor: Phillip R. Colline, Tustin, CA (US)

(73) Assignee: Seagate Technology LLC, Cupertino, CA (US)

( * ) Notice: Subject to any disclaimer, the term of this patent is extended or adjusted under 35 U.S.C. 154(b) by 254 days.

(21) Appl. No.: 15/689,395

(22) Filed: Aug. 29, 2017

(65) Prior Publication Data
US 2019/0065488 A1   Feb. 28, 2019

(51) Int. Cl.
*G06F 16/23*   (2019.01)
*G06F 11/07*   (2006.01)
*G06F 16/18*   (2019.01)

(52) U.S. Cl.
CPC .......... *G06F 16/23* (2019.01); *G06F 11/0709* (2013.01); *G06F 16/1873* (2019.01)

(58) Field of Classification Search
CPC ... G06F 16/23; G06F 16/1873; G06F 11/0709
See application file for complete search history.

(56) References Cited

U.S. PATENT DOCUMENTS

| | | | |
|---|---|---|---|
| 6,219,800 B1 * | 4/2001 | Johnson | G06F 11/1076 714/5.1 |
| 2005/0270855 A1 | 12/2005 | Earhart et al. | |
| 2006/0136619 A1 | 6/2006 | Edirisooriya et al. | |
| 2010/0293440 A1 | 11/2010 | Thatcher et al. | |
| 2011/0029847 A1 | 2/2011 | Goldenberg et al. | |
| 2013/0198585 A1 | 8/2013 | Braam et al. | |

* cited by examiner

*Primary Examiner* — Oleg Korsak
(74) *Attorney, Agent, or Firm* — Mueting, Raasch & Gebhardt, P.A.

(57) ABSTRACT

A write command includes data targeted to a data sector of a non-volatile memory. The data is committed to be stored in the data sector. Protection information bytes of the data are stored together with the data in the data sector, and the protection information bytes are copied to a distilled protection sector. A read request is received for the data and in response, the protection information in the data sector is validated against the copy of the protection information in the distilled protection sector.

19 Claims, 5 Drawing Sheets

PROTECTION SECTOR AND DATABASE USED TO VALIDATE VERSION INFORMATION OF USER DATA

SUMMARY

The present disclosure is directed to a protection sector and database used to validate version information of user data, e.g., to guard against missed writes. In one embodiment, a write command is received that includes data targeted to a data sector of a non-volatile memory. The data is committed to be stored in the data sector. Protection information bytes of the data are stored together with the data in the data sector, and the protection information bytes are copied to a distilled protection sector. A read request is received for the data and in response, the protection information in the data sector is validated against the copy of the protection information in the distilled protection sector.

In another embodiment, protection information of a data sector is copied to a distilled protection sector on a non-volatile, data storage medium. The distilled protection sector includes a protection information block with version information. The version information is tracked via in a database separate from the distilled protection sector. Responsive to an update of the data sector, an update is applied to the copy of the protection information of the data sector in the distilled protection sector. The update includes storing the updated protection information together with the updated data sector. Responsive to the copying of the protection information, the version information is changed in the database and the changed version information is recorded in the protection block of the distilled protection sector. For a read of the data sector subsequent to the update, the version information data in both the database and the distilled protection sector are verified.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
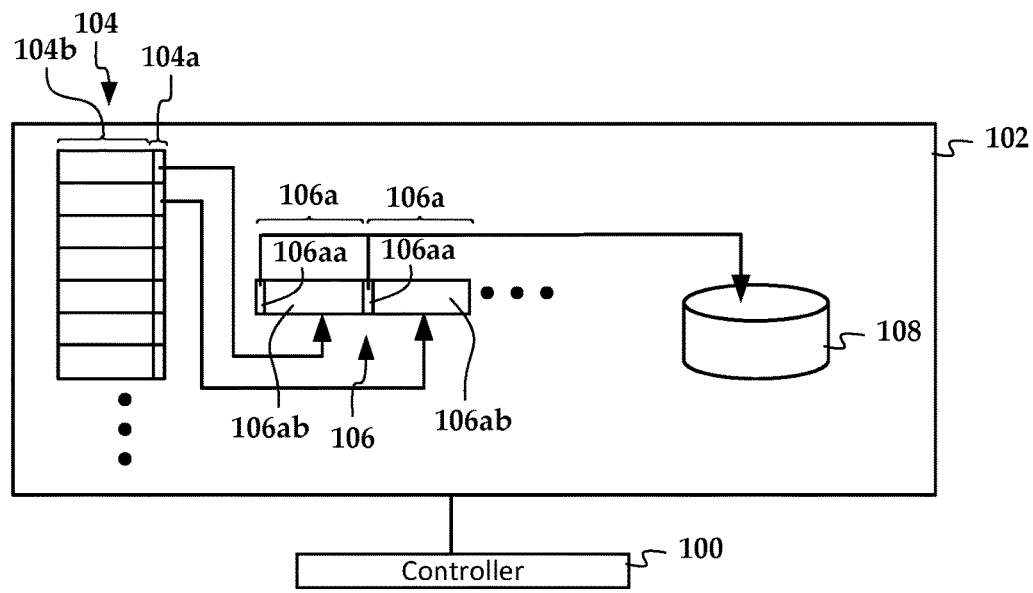
FIG. 1 is a diagram of a storage system according to an example embodiment.

The present disclosure generally relates to data storage drives that utilize persistent data storage media, e.g., hard disk drives (HDDs) and solid-state drives (SSDs). For purposes of the following discussion, a data storage drive is generally understood to be a self-contained device with a particular physical form factor (e.g., 3.5 inch, 2.5 inch, expansion card) and electrical/physical interface (e.g., SATA, SAS, SCSI, PCIe, etc.) An HDD device utilizes one or more magnetic heads to apply varying magnetic fields to a moving disk, and the changing fields are later read back by the same magnetic head and converted to data. An SSD device applies a level of electrical charge to a solid-state memory cell, which causes a threshold voltage of the cell to change. The threshold voltage is later determined by applying voltages to the cell and measuring the resulting current, thereby enabling reading back of the stored data.

Even though the read/write processes associated with HDDs and SSDs have relatively high reliability, there are occasionally errors when writing to and reading from the disk. For example, for magnetic disk storage defects in the media, electrical or mechanical disturbances, changes in head-to-disk spacing, etc., can cause some data to be written such that it cannot be reliably read back. For solid-state storage, cell deterioration, electrical noise, extreme temperatures, etc., can negatively affect the stored data. These sources of error can be dealt with at a device level by using error correction codes, redundant data, etc., allowing degraded data to be recovered in many cases.

In addition to cases where data is written in a degraded state, there are other cases where the write may have not occurred at all, sometimes referred to as a "missed write." A missed write occurs when a write to the recording medium is reported as successful status but never ends up being recorded to the media. This could be due to a drive issue, such as a bug or failure in the firmware or associated processing hardware. A missed write may also occur when write data is being stored in a volatile cache when power is lost.

While some users, e.g., of consumer computing hardware, may be able to tolerate an occasional missed write, other applications such as enterprise computing are less tolerant of write misses. Because loss of some data, e.g., data that records financial transactions, can have severe consequences, enterprise class hardware includes features to not only ensure integrity of data that is written to persistent media, but to at least detect and possibly compensate for missed writes.

An example of a set of standards often used in enterprise-class storage systems is referred to as the Small Computer System Interface (SCSI). The SCSI standards define protocols, commands, and electrical/optical interfaces used in transferring data between processors and computer storage (or other peripheral devices). Some SCSI storage interface features are defined by the T10 Technical Committee of the International Committee on Information Technology Standards (INCITS). One of these standards relates to providing end-to-end data protection and is sometimes referred to as the T10 Protection Information Model (PIM)

Generally, the T10 PIM defines extra sector-specific data, referred to herein as protection information (PI) or data integrity field (DIF). The T10 PI is stored with the user data stored in the sector and is also carried with the user data when it is streamed between devices, allowing devices in the end-to-end communication chain to check data integrity in a standardized fashion. The DIF is an 8-byte field, and so extends the sector size from, e.g., 512 bytes to 520 bytes. The DIF may be used with larger sectors than 512 bytes, e.g., 1K or 4K sectors. For purposes of the following discussion, the terms "sector," "block," and "page" may be used interchangeably, and the use of one of these terms is not intended to limit the scope to types of storage commonly associated with particular terms. For example, the use of the term "sector" is not intended to limit the description to only hard disk drive implementations.

In embodiments described below, a data storage device leverages the T10 PI in order to allow a drive to internally detect missed writes. Generally, parts of the storage medium are reserved to perform as a distilled protection sector (DPS). The T10 PI for each sector are copied to the DPS, and a part of this protection information (e.g., data within the application tag) is maintained in a separate database. The application tags (or parts thereof) are incremented in the database and DPS each time the data sector is changed. These versions are checked before reading to ensure the last write to the data sector completed successfully. This can be used to detect missed writes, as well as other data storage errors.

In FIG. 1, a block diagram illustrates a data storage device according to an example embodiment. A controller 100 is coupled to a non-volatile data storage medium 102. The data storage medium 102 may include any combination of magnetic disk, solid-state memory, optical storage, etc. User data is arranged into user data blocks 104 of a particular size. The user data blocks 104 may correspond to sectors, pages, etc. Each of the user data blocks 104 includes protection information 104a that may be located anywhere within the block 104. User data 104b is also stored in each block 104. The protection information 104a within each block pertains to the particular user data 104b within the same block 104. The protection information 104a includes at least a version field (also referred to herein as a version tag) with data that indicates the last change to the user data 104b. The protection information 104a may also include error correction codes, checksums, logical addresses, etc., used to detect and recover the user data 104b in the event of data corruption or write errors.

A portion of the storage medium 102 is reserved for one or more protection blocks 106, e.g., a DPS as described above. A copy of the protection information 104a from each of the blocks 104 is stored in sections 106a of the protection block 106. Each of the protection block sections 106a includes a version field 106aa that has data corresponding version fields in the protection information 104a. Other data 106ab may also be carried over from the protection information 104a, e.g., correction codes, checksums.

The protection block(s) 106 may use the same data structures as the user data blocks 104. For example, if the user data blocks 104 are 520 byte sectors, then the protection blocks 106 may also be a series of reserved 520 byte sectors, each sector having as many as 65 sections 106a that hold the protection information 104a of 65 data sectors. Therefore, the number of protection blocks 106 reserved for N user data sectors 104 in such a case is equal to N/65. These values can be adjusted appropriately for different sector or page sizes. As described below, the protection blocks 106 may use different structures (e.g., a special partition) or use a different media than the user data blocks 104.

The data from version fields 106aa is also maintained in a database 108 that is separate from the protection block(s) 106. The database 108 may use sectors/pages of the recording medium 102 similar to that of the blocks 104 and protection blocks. In other configurations, the database 108 may use a different format (e.g., relational database partition) and may be on other storage media (e.g., hybrid drive with multiple types of media).

Generally, if the user data blocks 104 are stored on a second, non-volatile medium that is different than a first non-volatile medium where the protection blocks 106 and/or database 108 are stored, then the first non-volatile medium may be selected to have particular characteristics suitable for this functionality. For example, the first medium may have higher performance (e.g., faster random access times, greater input/output bandwidth) than the first medium so as to reduce the impact on reads and writes of user data. The first medium may have smaller block sizes to facilitate reducing the size of reads and writes needed to maintain individual parts of the protection blocks 106 and/or database 108.

Figure 2:
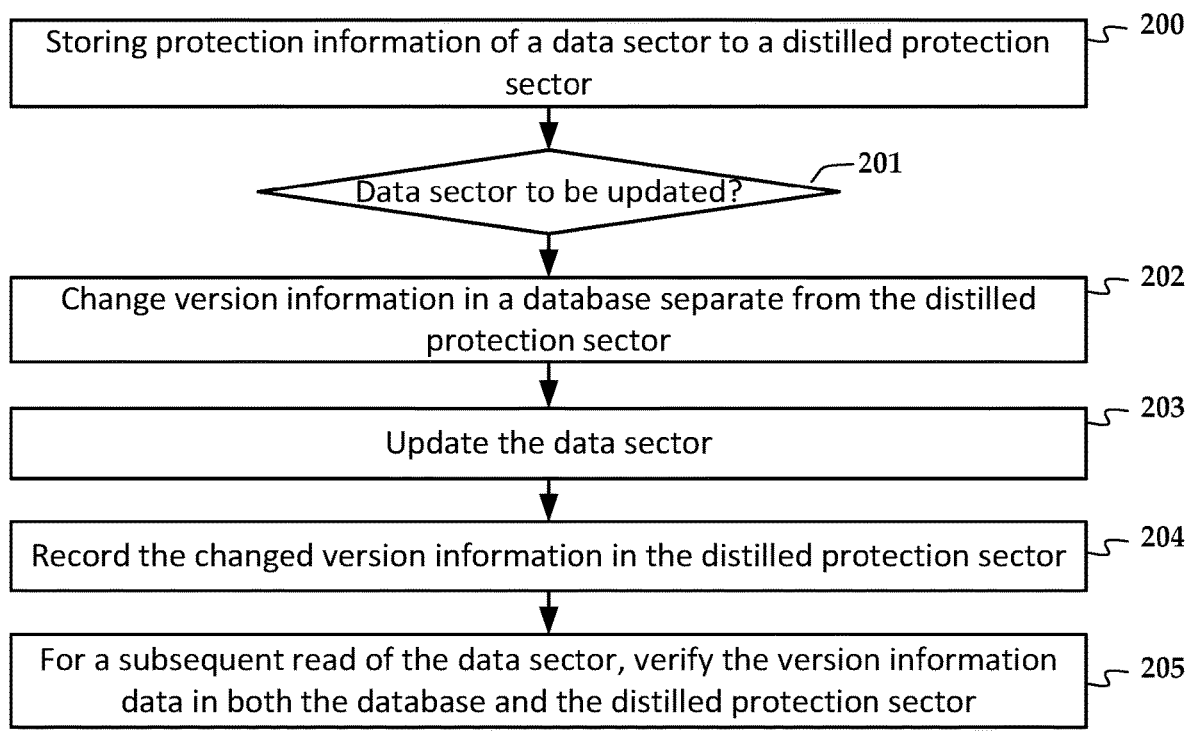
FIG. 2 is a flowchart of a method according to an example embodiment.

In FIG. 2, a flowchart illustrates a method for how the structures shown in FIG. 1 are set/modified according to an example embodiment. Protection information of a data sector is stored 200 to a distilled protection sector on a data storage medium. This may occur, for example, when sector is first written or later updated. The protection information may be copied from the data sector such that a duplicate is stored in the distilled protection sector. In another configuration, the protection information may be stored only in the distilled protection sector. The protection information includes version information, e.g., a two-bit value stored in a T10 application tag. The version information is tracked via in a database that is separate from the distilled protection sector.

Responsive an update 201 of the data sector, the version information in the database is changed 202 before the update is applied 203 to the data sector. The changed version information in the distilled protection sector is recorded 204 after the update is applied 203 to the data sector. For a read of the data sector subsequent to the update 203, the version information data in both the database and the distilled protection sector is verified. If there is a difference between the two, this could indicate a missed write. In addition, the version information data in the data sector itself can be compared to one or both version data in the distilled protection sector and database.

Figure 3:
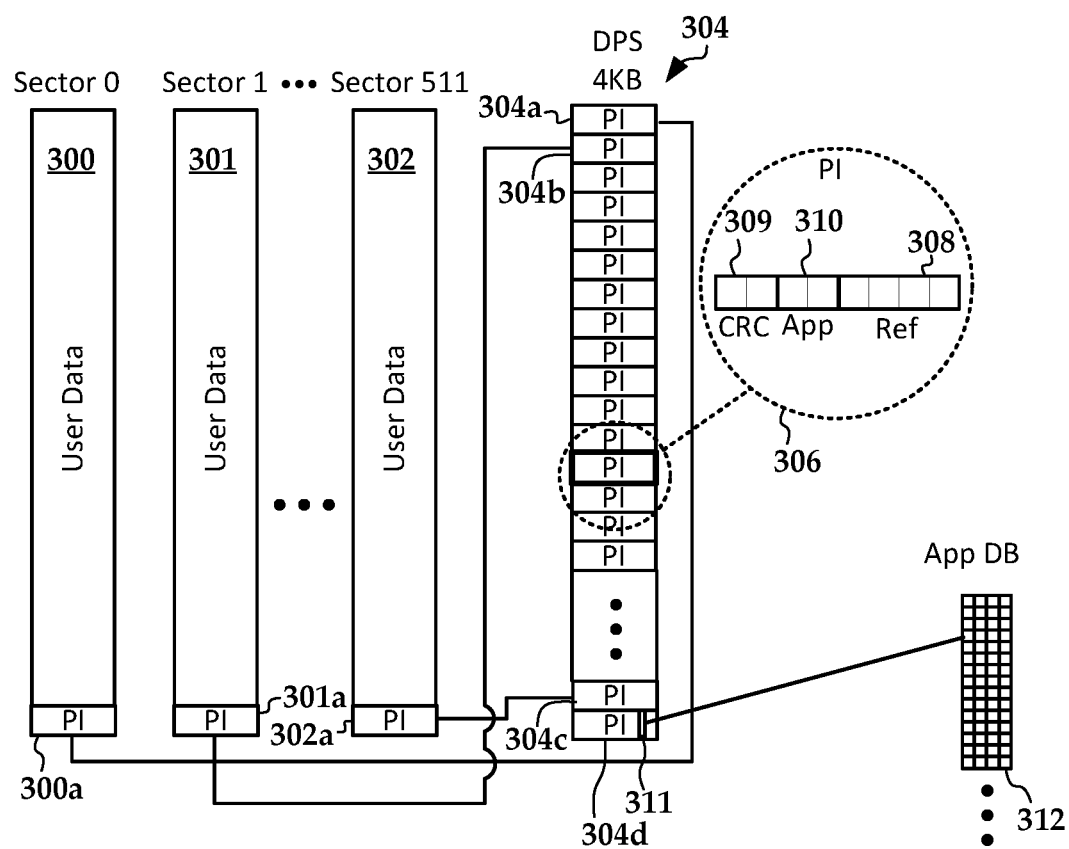
FIG. 3 is a block diagram of a data protection scheme according to an example embodiment.

In FIG. 3, a block diagram shows a data protection scheme according to an example embodiment. User data sectors 300-302 each have associated protection information parts 300a-302a. A distilled protection sector 304 includes entries 304a-c that respectively correspond to information protection information parts 300a-302a. In this example, the distilled protection sector 304 is 4096 bytes (4 KB), and therefore can hold the protection information of 512 user data sectors. The illustrated user data sectors 300-302 are also 4 KB.

As indicated in the detail view 306, each 8-bytes of protection information includes a 4-byte reference tag 308, a 2-byte guard tag 309 (also referred to as cyclic redundancy check, or CRC), and a 2-byte application tag 310. The guard and reference tags 309, 308 include data that is processed end-to-end along the communication path. The content, use, and format of these tags 308, 309 is defined in the T10 standards. The application tag 310 is for user-defined content. The distilled protection sector 304, which is itself a data sector, includes a protection block 304d (e.g., SCSI T10 protection information) appended thereto. The protection block 304d is used internally (e.g., via drive, storage controller, and/or host) to protect the data stored in the distilled protection sector 304. For example, the protection block 304d may include the same protection information shown in detail view 306, with a guard tag that includes a CRC of the data protection sector 304. In addition, a portion 311 (e.g., two-bits) of the application tag within the protection block 304d can be used as a version number, the version number being incremented each time a data sector tracked by the distilled protection sector 304 is updated. This incrementing may also involve wrapping around the version value, e.g., transitioning from '11' to '00' for a two-bit version counter.

The two-bit version information 311 from protection block 304d is also maintained in an application tag database 312. In this example, the application tag database 312 includes a series of bytes. The database 312 may include one or two-byte entries that include copies one or both bytes of the application tag of the protection block 304d. In other arrangements, the bits of the version information 311 can be packed into the bytes, e.g., such that each byte holds the version information 311 for four data protection sectors. If one or two bytes are stored in the database 312 for each data protection sector, additional information besides the version information may be stored in the remaining 6-14 bits. For example, an indicator (e.g., least significant bits) of the address range of the associated data sectors 300-302 or the data protection sector 304 may be placed in the database entries. Other information, such as a drive index discussed below, may also be included in the application tag of protection block 304d and database 312.

In response to a request to write a sector (sector 300 in this example), the distilled protection sector protection information 304a corresponding to the sector 300 is read. The version information 311 is read from the distilled protection sector 304 and validated against the corresponding version information in the tag database 312. Assuming the version information is validated, the protection information (which will be located at 300a together with the rest of sector 300 after writing) of the incoming write data is used to update the entry 304a in the distilled protection sector 304. The two-bit version information 311 in the tag database 312 is then incremented after this update. Then the data of the request is written to the user data sector 300, after which the incremented two-bit version information 311 is written to the protection block 304d in the distilled protection sector 304.

When a read operation is performed (again targeting sector 300 for this example) the corresponding version information 311 from the tag database 312 is referenced and used to validate the data protection sector 304. Also, the protection block 304d (e.g., CRC in guard tag) is used to validate integrity of the distilled protection sector 304. The user data is then read from the sector 300. The protection information 300a of the sector 300 is validated against the corresponding value 304a in the distilled protection sector 304, and then the data itself is validated via the guard tag 309 in the protection information 300a.

Figure 4:
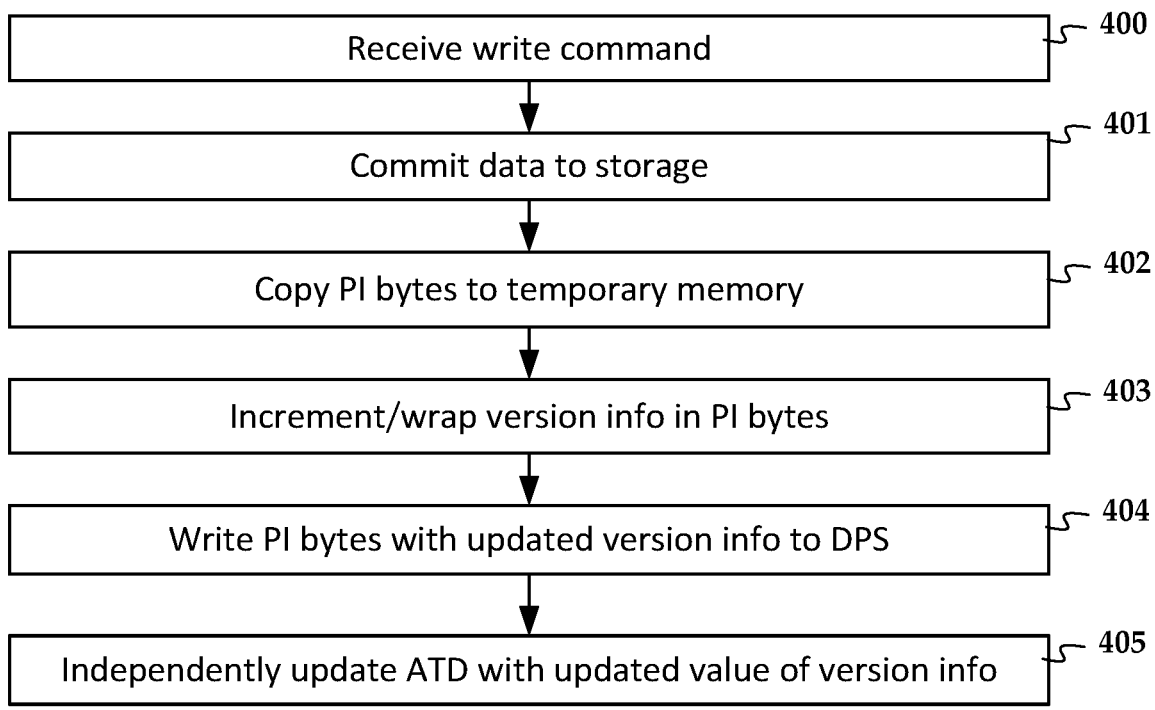
FIGS. 4 and 5 are flowcharts of methods according to example embodiments.

There may be alternate techniques/sequences used to update the version information described above in relation to FIGS. 4 and 5. These techniques may be implemented within the drive itself, e.g., via drive firmware. The write operation of a device according to one configuration is shown in the flowchart in FIG. 4. A write command is received 400 with data targeted to the sector 300, and the drive commits 401 the data (e.g., puts it in a write queue to be stored in a non-volatile memory) and copies the protection information bytes 300a from the data to temporary memory, e.g., to volatile memory. After writing 404 the distilled protection sector 304 in non-volatile memory, the drive increments/wraps 403 the version information 311. Upon write command completion (e.g., both the user data and the distilled protection sector are written), the application tag database (ATD) 312 is independently updated 404 with an incremented value of the version information 311 corresponding to version information in the protection block 304d.

Figure 5:
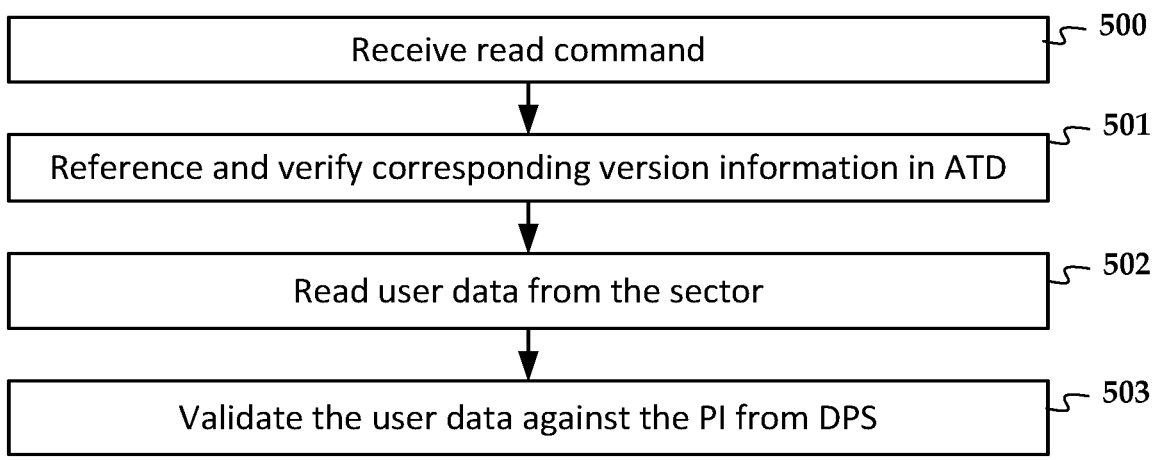

In FIG. 5, an alternate read implementation is shown. In this configuration, when a read request for the sector 300 is received 500, the corresponding version information in the application tag database 312 is referenced and verified 501, e.g., against corresponding version information in the distilled protection sector's protection block 304d. The user data 502 is then read from the sector 300, and the drive validates the data against the protection information 304a (e.g., the guard tag 309) stored in the distilled protection sector 304.

The use of duplicate protection information in the distilled protection sector and tag database can incur performance penalties due to the extra read/write operations used to maintain these structures. These penalties can be mitigated by locating some or all of the distilled protection sector and/or application tag database in higher speed memory of the drive (e.g., flash memory portion of a hybrid drive, non-volatile cache of a conventional drive, additional memory added to the controller board, etc.). The firmware of the drive may be modified to reserve space in these memory regions and perform the indicated operations, e.g., using modules or logic circuitry that can optimize the indicated data retrieval and validation operations.

Figure 6:
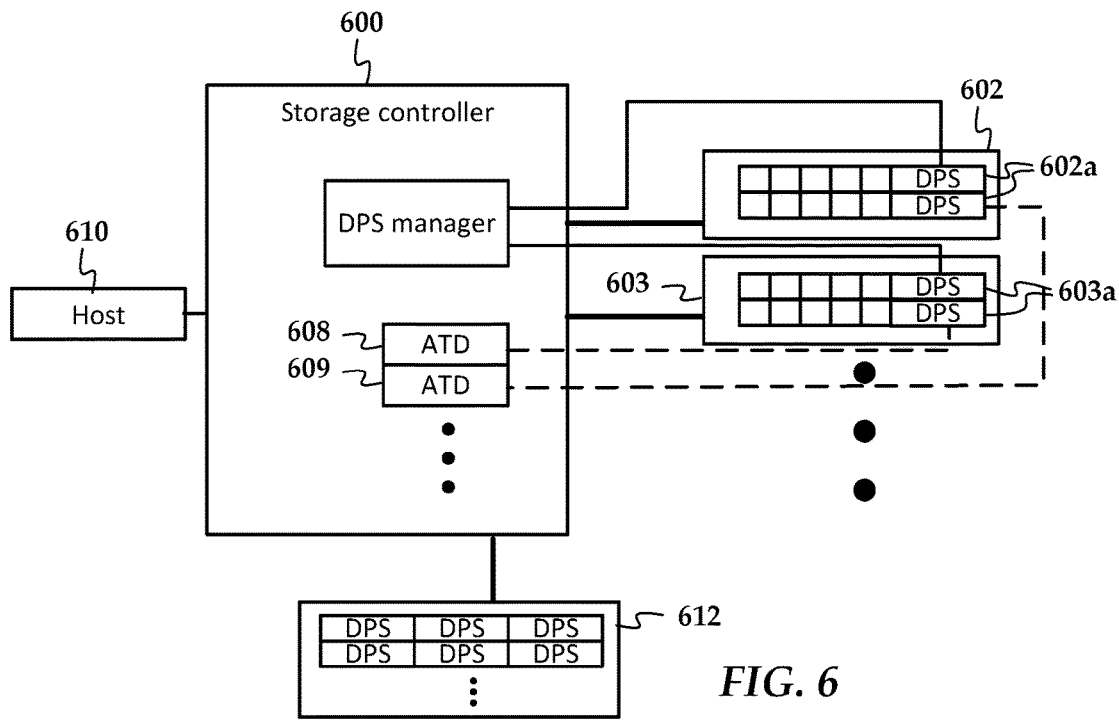
FIG. 6 is a block diagram of a storage controller with data protection features according to another example embodiment.

While the distilled protection sector and application tag database can be implemented wholly within a drive (e.g., operations performed by drive controller, database stored in drive memory), in other implementations a storage controller may manage these operations. In FIG. 6, a block diagram shows a storage controller 600 according to an example embodiment. The storage controller 600 (e.g., RAID controller) is coupled to one or more data storage drives 602, 603. The storage controller 600 includes a distilled protection sector manager 606 that maintains the distilled protection sectors 602a, 603a within the drives 602, 603 as described above. This maintenance includes initial allocation, updating, and validation of the distilled protection sectors 602a, 603a during operation. The storage controller 600 maintains its own application tag database 608, 609 for each drive 602, 603. In this way, the storage controller 600 can provide an independent check on the validity of the distilled protection sectors 602a, 603a.

In other implementations, a host 610 could instead some or all of these functions shown being performed by the storage controller 600, e.g., in cases where drives are directly coupled to the host. In another alternate implementation, a special drive 612 could be reserved for a drive array 602, 603. Instead of storing distilled protection sectors 602a, 603a on drives 602, 603, the distilled protection sectors could instead be stored on the reserved drive 612. This could be implemented by the host 610 or storage controller 600.

In addition to operations that occur in response to read and write requests, a drive or storage controller implementing these data protection features can also validate the protection information asynchronously, e.g., as a background process. For example, an enhanced scrub operation could verify the version information in the distilled protection sector versus the corresponding information in the application tag database. A more thorough operation may also compare the protection information for each drive sector against the distilled protection sector, including guard tags, etc.

Figure 7:
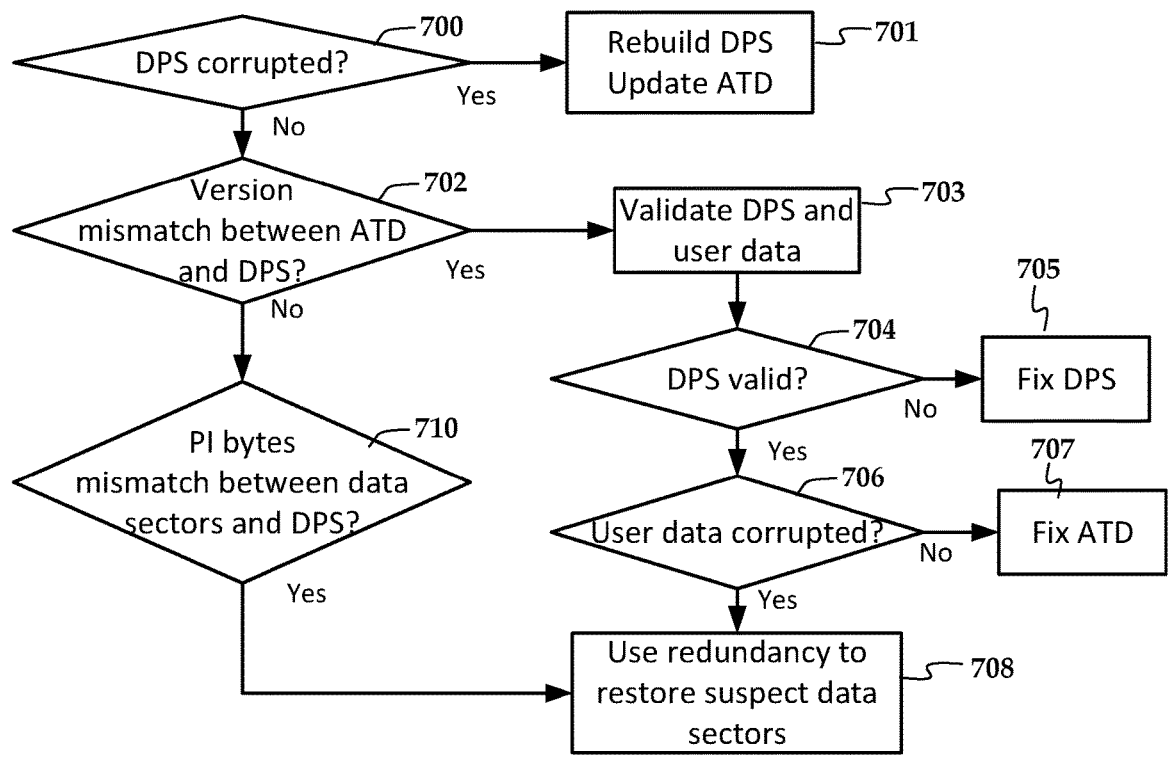
FIG. 7 is a flowchart of an error recovery procedure according to an example embodiment.

In the scenarios described above, it was assumed that checks made against the distilled protection sector and application tab database were successful. In FIG. 7, a flowchart shows how a mismatch between various protection data is handled. As determined at block 700, if the distilled protection sector is corrupted (e.g., by checking distilled protection sector data 304 against CRC in protection block 304d), then the distilled protection sector is rebuilt 701 (e.g., using protection information from associated user data sectors), its version reset, and the application tag database is updated. If the data protection sector is not corrupted but the application tag database and distilled protection sector version information don't match (block 702 returns 'no'), the either the distilled protection sector has a missed write or the associated bits in the application tag database are corrupted. This can be determined by validating 703 the distilled protection sector against the stored data, e.g., in case there was a missed write of both the distilled protection sector and data sector.

For example, in a RAID setup, redundancy data from other disk drives can be used to ensure each data sector is indeed current and also the protection information in the data sector is valid, e.g., matches the copy of the protection information stored in the distilled protection sector. It might be determined that the data sector is current but a distilled protection sector entry associated with the sector does not match, implicating the distilled protection sector. In such a case, block 704 returns 'no' and the distilled protection sector is repaired 705. If the redundancy data confirms each data sector and every data sector matches the distilled protection sector, then block 706 returns 'no' and the application tag database is corrected 707. Otherwise it may be assumed that user data is corrupted and can be restored 708 through redundancy.

If block 702 returns 'no' but there is a mismatch of protection information bytes in distilled protection sector compared to the protection information bytes in the associated user data sector (block 710 returns 'yes)', then there may have been a missed write on the sector in question or the sector's protection information may have been corrupted. In either case, redundancy can be used to restore 708 the suspect sector.

Generally, a distilled protection sector as described herein provides missed write protection by at least providing a duplicate of the guard tag for each sector. The version information and the application tag database provides an extra layer of protection to detect when a misbehaving drive does not successfully execute multiple writes to update the protection information, e.g., one to the data sector and the other to the distilled protection sector. In addition to the indicated distilled protection sector version information, the application tag database may also include drive index information. The drive index protects against RAID 1 (mirror) or other potential drive mixing scenarios. The drive index provides a different type of protection that ensures the RAID controller (or host system in direct attach cases) is referencing the correct drive. A scrub or other operation may be used validate that all drive indices match the drive number. A mismatch means the wrong drive.

The data structures described above will reduce storage space available for user data, but not significantly. For example, for a drive with 4 k sectors, 0.2% of the space may be used for the distilled protection sector (e.g., 2 GB for DPS per 1 TB drive capacity). The application tag database is also reasonably small. e.g., 128 KB per 1 TB of drive capacity. This allows the application tag database to be stored and accessed from non-volatile or redundant high-speed memory.

Figure 8:
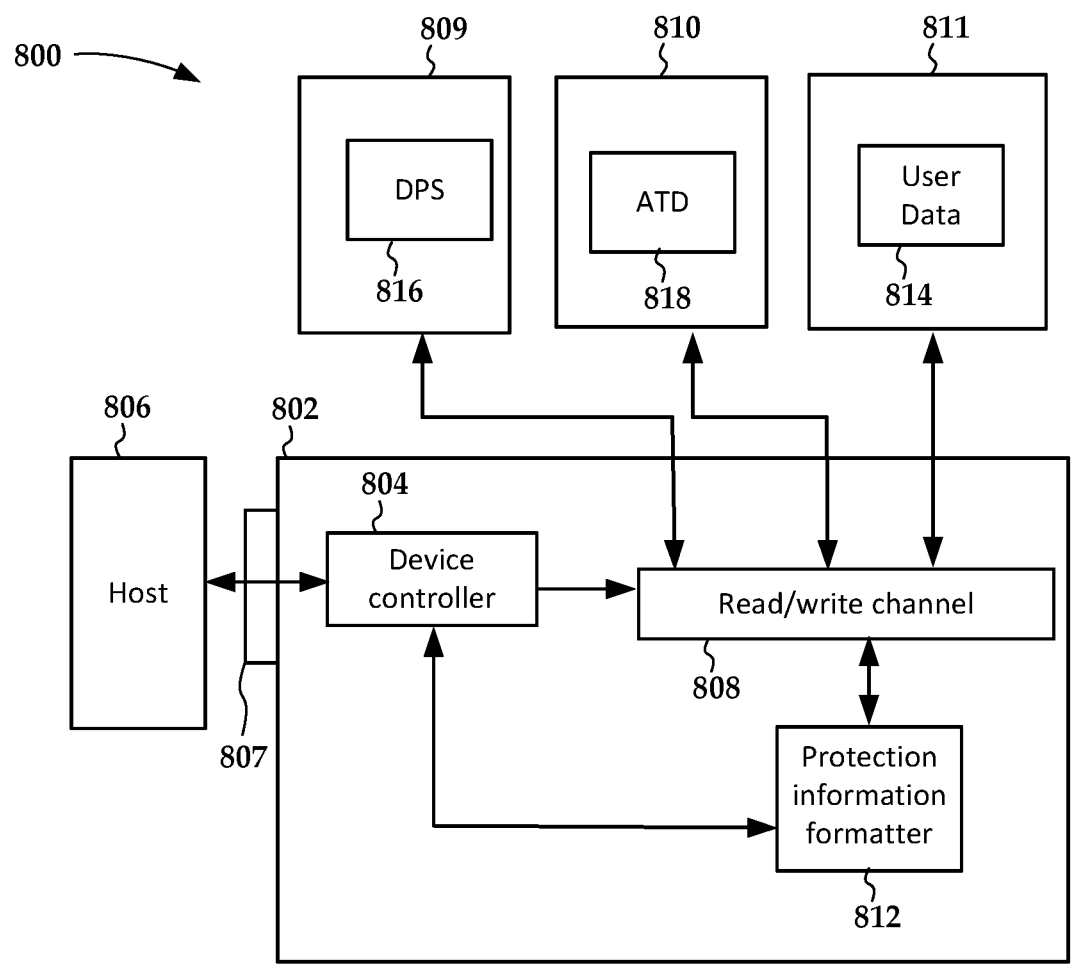
FIG. 8 is a block diagram of a storage device according to an example embodiment.

In FIG. 8, a diagram illustrates components of a data storage drive 800 according to an example embodiment. The drive 800 includes circuitry 802 such as a device controller 804 that processes read and write commands and associated data from a host device 806 via a host interface 807. The host interface 807 includes circuitry that enables electronic communications via standard storage protocols (e.g., SATA, SAS, NVMe, SCSI, Ethernet, etc.). The host device 806 may include any electronic device that can be communicatively coupled to store and retrieve data from a data storage device, e.g., a computer, a server, a storage controller. The device controller 804 is coupled to one or more read/write channels 808 that reads from and writes to one or more sections of non-volatile memory 809-811. While separate sections of memory 809-811 are shown, some may share the same media in some embodiments, e.g., sections 810 and 811 may be located on a magnetic disk and section 809 on flash memory. For a flash drive embodiment, all sections 810-811 may be in flash memory, but one or more sections may be in a different class of memory that has different performance and/or reliability characteristics.

The read/write channel 808 generally converts data between the digital signals processed by the device controller 1004 and the digital or analog signals that cause the data to be read from or written to memory section 810, 811. For example, if one or more of the memory sections 809-811 includes a magnetic disk, then the read/write channel 808 may convert digital data to analog signals used to record data to and read data from the disk. If one or more of the memory sections 809-811 includes flash memory, then the read/write channels may be digital interfaces that select addresses and read/write data to registers via control circuitry built on the memory dies. If the drive 800 uses a combination of different memory types, multiple read/write channels 808 will be included to handle these different media.

A protection information formatter 812 is a functional component (e.g., software or firmware module, logic device) that manages protection information on behalf of the system controller 804. For reads and writes targeted to user data pages/sectors 814, the protection formatter 812 maintains a distilled protection sector 816 that stores protection information for each sector. This protection information may be exclusively stored in the distilled protection sector 816 or duplicate of protection information stored with the user data 814. An application tag database 818 is used to store version information about the distilled protection sector 816, which also stores a copy of this version information.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:

receiving a write command with user data targeted to a data sector of a non-volatile memory;

committing the user data to be stored in the data sector, protection information bytes of the data being stored together with the data in the data sector, the protection information bytes including both a cyclic redundancy code and version information;

copying the protection information bytes to a distilled protection sector that stores protection information from multiple data sectors, wherein the distilled protection sector has a same size as the data sector, and wherein the distilled protection sector is appended with a second cyclic redundancy code and second version information;

receiving a read request for the data; and in response to the read request, validating the protection information bytes in the data sector against the copy of the protection information bytes in the distilled protection sector.

2. The method of claim 1, further comprising, in response to copying the protection information bytes to the distilled protection sector:
 incrementing version information stored in the distilled protection sector; and
 independently updating a database with the incremented version information, the database separate from the distilled protection sector and storing only the version information.

3. The method of claim 2, wherein the data sector and distilled protection sector are stored on one or more data storage drives coupled to a storage controller, wherein the database is stored on the storage controller.

4. The method of claim 2, wherein the user data sector, the distilled protection sector, and the database are stored on two or more memory sections of a storage drive.

5. The method of claim 2, further comprising, in response to the read request, validating the incremented version information between the database and the distilled protection sector, a mismatch between the incremented version information in the database and the distilled protection sector being indicative of a missed write to the distilled protection sector.

6. The method of claim 1, wherein a mismatch between the protection information of the data sector and the copy of the protection information in the distilled protection sector is indicative of a missed mite to the data sector.

7. A method, comprising:
 copying protection information from a data sector to a distilled protection sector on a first, non-volatile, data storage medium, the protection information comprising both a cyclic redundancy code and version information, only the version information of the protection information being tracked via in a database separate from the distilled protection sector;
 responsive to an update of the data sector, copy updated protection information of the data sector to the distilled protection sector, the update to the data sector including storing the updated protection information together with updated data of the data sector;
 responsive to copying the updated protection information, changing the version information in the database and recording the changed version information in the protection block of the distilled protection sector; and
 for a read of the data sector subsequent to the update, verifying the changed version information data in both the database and the distilled protection sector.

8. The method of claim 7, wherein the version information comprises a two-bit value.

9. The method of claim 7, wherein the data sector is stored on a second non-volatile recording medium, the first non-volatile recording medium having higher performance than the second non-volatile recording medium.

10. The method of claim 7, wherein a mismatch in the changed version information between the database and the distilled protection sector is indicative of a missed write to the distilled protection sector.

11. The method of claim 7, wherein the distilled protection sector and the data sector are both stored on one or more drives of an array, and wherein the database is stored on a controller coupled to the array.

12. The method of claim 11, wherein the distilled protection sector and the data sector are stored on different drives of the array.

13. The method of claim 7, wherein the distilled protection sector has a same size as the data sector, and wherein the distilled protection sector is appended with a second cyclic redundancy code and second version information.

14. An apparatus comprising:
 one or more non-volatile memory sections comprising:
  a plurality of user data sectors comprising user data and protection information;
  a distilled protection sector with the protection information copied from the plurality of user data sectors, the protection information comprising both a cyclic redundancy code and version information;
  a database separate from the distilled protection sector, the database tracking the only the version information of the distilled protection sector; and
 a controller coupled to the one or more non-volatile memory sections and operable to perform:
  responsive to an update of a data sector of the user data sectors, update the protection information in the user data sector and copy the updated protection information of to the distilled protection sector, the update to the data sector including storing the updated protection information together with updated user data of the data sector, updating the protection information comprising changing the version information;
  responsive to copying the updated protection information, recording the changed version information in the database; and
  for a read of the data sector subsequent to the update, ensuring the changed version information data matches in both the database and the distilled protection sector.

15. The apparatus of claim 14, wherein for the read of the data sector subsequent to the update, ensuring the updated protection information of the data sector matches the copy of the updated protection information in the distilled protection sector, wherein a mismatch between the updated protection information of the data sector and the copy of the updated protection information in the distilled protection sector is indicative of one of a missed write to the data sector or a missed write to the distilled protection sector.

16. The apparatus of claim 14, wherein the version information is stored in an APP tag of SCSI T10 protection information appended to the distilled protection sector.

17. The apparatus of claim 14, further comprising a storage controller that includes one of the sections of the non-volatile memory that stores the database, the storage controller coupled to a storage drive that includes other sections of the non-volatile memory that store the user data sectors and the distilled protection sector.

18. The apparatus of claim 14, wherein a mismatch in the changed version information between the database and the distilled protection sector is indicative of one of a missed write to the distilled protection sector or corruption of the database.

19. The apparatus of claim 18, wherein the determination of the missed write to the distilled protection sector or corruption of the database is determined by comparing the updated protection information between the distilled protection sector and the data sector, wherein the database is corrupted if the distilled protection sector is valid and the data sector matches the distilled protection sector.

* * * * *

UNITED STATES PATENT AND TRADEMARK OFFICE
CERTIFICATE OF CORRECTION

PATENT NO. : 10,642,816 B2  
APPLICATION NO. : 15/689395  
DATED : May 5, 2020  
INVENTOR(S) : Phillip R. Colline Page 1 of 1

It is certified that error appears in the above-identified patent and that said Letters Patent is hereby corrected as shown below:

In the Claims

Column 9, Claim 6, Line 4, the word "mite" should read "write".

Signed and Sealed this
Eighth Day of December, 2020

Andrei Iancu
*Director of the United States Patent and Trademark Office*